(12) United States Patent
Lalouette

(10) Patent No.: US 7,520,389 B2
(45) Date of Patent: Apr. 21, 2009

(54) PACKAGE STRUCTURE FOR SOFT MOUNTING DIRECT CONNECT STORAGE DEVICE

(75) Inventor: Marc Lalouette, Boulder, CO (US)

(73) Assignee: Seagate Technologies, LLC, Shakopee, MN (US)

( * ) Notice: Subject to any disclaimer, the term of this patent is extended or adjusted under 35 U.S.C. 154(b) by 1026 days.

(21) Appl. No.: 10/852,492

(22) Filed: May 24, 2004

(65) Prior Publication Data

US 2005/0257949 A1 Nov. 24, 2005

(51) Int. Cl.
*H02G 3/08* (2006.01)
(52) U.S. Cl. .................. 206/722; 206/594; 206/320; 206/723; 206/724; 206/523; 174/50
(58) Field of Classification Search .............. 206/320, 206/722–724, 701, 523, 594, 772; 174/50
See application file for complete search history.

(56) References Cited

U.S. PATENT DOCUMENTS

| | | | |
|---|---|---|---|
| 5,484,063 A * | 1/1996 | Cuccio et al. .............. 206/722 |
| 5,553,444 A | 9/1996 | Lovecky | |
| 5,694,267 A | 12/1997 | Morehouse | |
| 5,777,845 A | 7/1998 | Krum | |
| 5,837,934 A | 11/1998 | Valavanis | |
| 5,931,297 A * | 8/1999 | Weill et al. .................. 206/320 |
| 5,954,203 A * | 9/1999 | Marconi .................... 206/464 |
| 6,154,360 A | 11/2000 | Kaczeus | |
| 6,222,121 B1 | 4/2001 | Cheng | |
| 6,233,143 B1 | 5/2001 | Gamble | |
| 6,359,836 B1 | 3/2002 | Sevier | |
| 6,401,930 B1 * | 6/2002 | Boyer et al. ................ 206/721 |
| 6,510,050 B1 | 1/2003 | Lee | |
| 2002/0044416 A1 | 4/2002 | Harmon | |
| 2002/0079244 A1 | 6/2002 | Kwong | |

* cited by examiner

*Primary Examiner*—Tammara Peyton
(74) *Attorney, Agent, or Firm*—Westman, Champlin & Kelly, P.A.

(57) ABSTRACT

A method and article of manufacture for protecting a device from damage caused by physical shocks during shipment, handling, and use of the device are disclosed. A shock-absorbing container is provided with a foam material provided around the device when it is placed in the container. An opening in the container is aligned with respect to the device so as to expose a physical interface of a bay to the physical interface of the device in the container. The device and container are proportioned so that when the container, containing the device, is slid into a bay of a device array or data processing system, the physical interface directly connects with a mating physical interface in the bay without requiring an interposer between the physical interface of the device and the physical interface of the array or data processing system.

32 Claims, 6 Drawing Sheets

PACKAGE STRUCTURE FOR SOFT MOUNTING DIRECT CONNECT STORAGE DEVICE

FIELD OF THE INVENTION

The field of the present invention is generally directed to a package structure for soft mounting direct connect storage devices. More specifically, the present invention is directed to a method and device for protecting disc drives and other information-storage devices from damage resulting from impact and electrostatic discharge during shipment and during use as a hot-swappable storage device.

BACKGROUND OF THE INVENTION

The principal cause of failure of disc drives is handling damage, not operational failure (so-called disc crashes). Handling damage occurs as a result of bumping or dropping the disc drive or causing it to come in contact with a hard surface. Such handling damage is classified as disc slip, head slaps, or gross cosmetic damage. Handling damage may occur during freight transit, carton handling, actual product handling, and product-system integration.

Generally similar damage occurs in the case of other information-storage devices, such as tape drives and optical drives. Additional non-operational damage to disc drives and similar devices occurs as a result of electrostatic discharge, and it is typical to ship devices in an anti-static (static-shielded) bag (also known as an ESD bag) to prevent or reduce such damage.

Commonly assigned U.S. Pat. No. 6,220,442, to Merrell et al., describes an article of manufacture and method for protecting information-storage devices from damage during shipping and handling. The article of manufacture described in the Merrell patent, and depicted in FIG. 1, is a container that is molded from a static-dissipative resilient plastic material that is ribbed to protect the information-storage device inside from physical shocks. When the information-storage device stored in the container is to be used, the container is opened and the information-storage device is removed for installation in a computer or other machine requiring information storage.

Another device, described in U.S. Pat. No. 5,837,934 to Valavanis, is a shock-insulated container for storing a hard disc drive to be used in a coin-operated video game console. The Valavanis container is intended to be used during shipping, handling, and operation of the disc drive. In Valavanis, the hard disc drive is wrapped in a liner made of a foam material and the wrapped hard disc drive is enclosed in an enclosure made of an anti-static plastic. A connector ribbon extends from inside the enclosure to the outside of the enclosure to allow a connection with a video game console to be made. The Valavanis container is perforated so as to allow the container to be bolted to a video game console.

Recent developments in computer hardware technology pose additional challenges to preventing damage to information-storage devices due to physical shock. In recent years, the computer hardware industry has been moving more and more in the direction of making hardware devices "hot-swappable." The term "hot-swappable" is used to describe hardware devices that may be removed or added to a computer system while the computer system is operating and without any loss of functionality. In particular, hot-swappable information-storage devices are now being used in computer systems and data storage systems, such as RAID arrays (Redundant Arrays of Inexpensive Discs—sometimes also referred to in the generic sense as Redundant Arrays of Independent Devices). Typically, a hot-swappable information-storage device will be adapted to slide into a recessed area, called a drivebay, and mount to electrical connections in the back of the drivebay space once fully inserted into the drivebay. Thus, hot-swappable information-storage devices, by their very nature, are subject to a considerable amount of handling, even after being placed into operation.

Containers designed for non-hot-swappable drives, such as in Merrell and Valavanis are not adapted to protect an information-storage device from the shocks associated with sliding the device in and out of a drivebay or the general wear and tear of multiple insertions and removals. A device stored in a Merrell-type container must be removed from the container before installation. A device stored in a Valavanis-type container need not be removed from the container, but since the Valavanis container was designed to be permanently bolted to a video-game console and connected to the video-game console hardware via a ribbon connector, the Valavanis container is clearly unsuitable for solving the problem of protecting a removable hot-swappable storage device. That is, once bolted to the video-game console hardware, the container and hard drive are not removable in a hot-swappable manner. To the contrary, the video-game console must be opened and considerable effort employed in removing the hard drive from the video-game console hardware.

A number of containers have been developed to assist in the prevention of handling-related damage in hot-swappable information-storage devices. These containers, however, tend to employ mechanisms with moving parts and are expensive to mass-produce for the consumer and small-business markets. Thus, there is a need for a simple, inexpensive solution to the problem of protecting a hot-swappable, or soft mounting, information storage device, e.g., a hard disc drive, from physical impacts. The present invention provides a solution to this and other problems, and offers other advantages over previous solutions.

SUMMARY OF THE INVENTION

The present invention provides a method and article of manufacture for protecting an information-storage device from damage caused by physical shocks in the course of shipment, handling, and use of the device. In a preferred embodiment of the present invention, a shock-absorbing container is molded from a static-dissipative, resilient plastic material. An opening in the container is aligned with respect to a physical interface of the device so as to provide an opening through which a physical interface of a drivebay of a computing system may be coupled to the physical interface of the device. The device and container are proportioned so that when the enclsoure containing the device is slid into a drivebay of a storage device array or data processing system, the physical interface of the device connects with a physical interface in the drivebay. This allows the container to continue to protect the device from physical shocks while in operation or while being "hot-swapped" in or out of the drivebay.

The device is preferably positioned within the container and a foam packing material is provided within the container around the device. The foam is preferably more stiff in an x and y direction relative to a stiffness in a z direction, wherein the x and y direction are in the horizontal and vertical directions while the z direction is along a depth axis, i.e. the z direction is the direction in which the container will be slid in order to insert it into the drivebay.

The stiffness of the foam packing material aids in maintaining the drive in approximately as stationary position within the container. Some movement of the device may be experienced over time due to multiple insertions and removals of the container from drivebays. Therefore, in a preferred embodiment, the present invention utilizes a Serial ATA connector interface on the device to directly connect the device to the connector interface of the drivebay. That is, no interposer is utilized with the drive and container structure of the present invention. To the contrary, the Serial ATA connector is designed to permit some measure of misalignment of the connector pins and therefore, even though some small movements of the device within the container may be experienced, these small movements are tolerable through use of the Serial ATA connector.

In addition, in other embodiments of the present invention, the foam packing material provided around the device and upper and lower portions of the container may aid in cooling the device during operation. For example, the foam packing material, may be formed from a thermally conductive visoelastic material, such as a Bergquist SF1000 material which is impregnated with heat conductive ceramic particles. The thermally conductive visoelastic material foam may then conduct heat from the device to the upper and lower portions of the container. Alternatively, a separate thermally conductive visoelastic material member (not shown) may be provided separate from, or in addition to, the foam packing material in order to achieve heat conduction to the upper and lower portions of the container. In addition, the upper and lower portions of the container may be made from a heat conductive material, such as an aluminum or magnesium material, which aids in dissipating the heat from the device.

Thus, the present invention provides a relatively less expensive solution for providing a shock protected soft mounting, or hot-swappable, device, in which the device may be directly connected to the computing device without the need for an interposer. These and various other features and advantages that characterize the present invention will be apparent upon reading of the following detailed description and review of the associated drawings.

DETAILED DESCRIPTION

The container or package of the present invention may take many forms and configurations. The following description of the preferred embodiments will provide some exemplary embodiments of the present invention, but it should be appreciated that the present invention is not limited to any one particular exemplary embodiment. To the contrary, the form and configuration of the present invention is only limited by the scope of the claims set forth hereafter.

Figure 1:
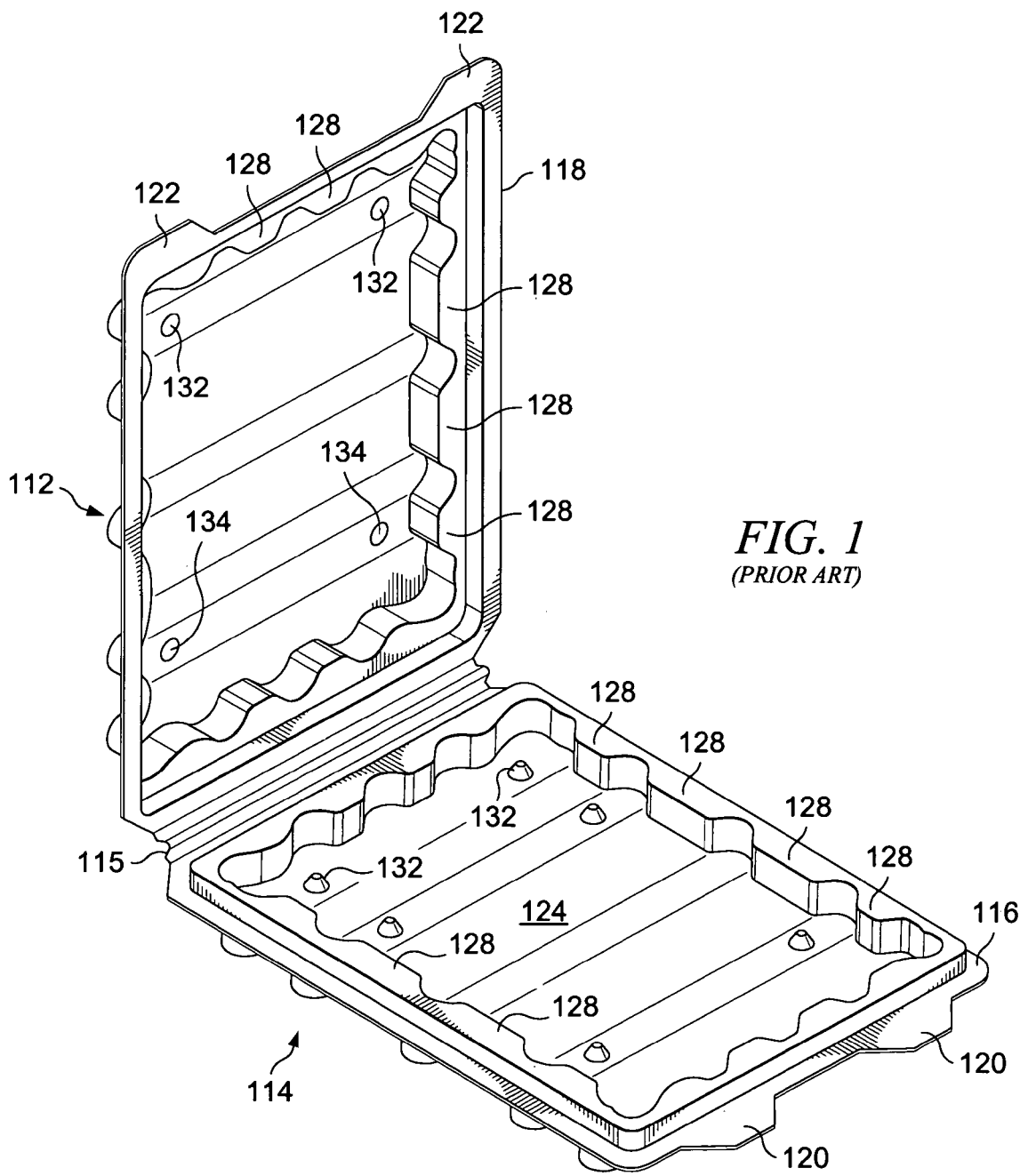
FIG. 1 is a perspective drawing of an opened package according to U.S. Pat. No. 6,220,442, from a vantage point above the left proximal end of the lower portion of the package.

One preferred embodiment of the present invention is based on the design of Seagate's commercial SEASHELL™ package for a disc drive. Specifically, this preferred embodiment improves upon the original SEASHELL™ design (which is described in U.S. Pat. No. 6,220,442, hereby incorporated by reference) by adding the additional feature of an opening that is aligned with respect to the contained disc drive such that the disc drive's physical interface is exposed. Referring to FIG. 1, a perspective drawing of an opened SEASHELL™ package (without the added opening of the present invention) from a vantage point above the left proximal end of the lower portion of the package, it is seen that this "clamshell" package 110 comprises an upper molded-sheet portion 112 and a lower molded-sheet portion 114. Upper and lower molded-sheet portions 112 and 114 are joined at their distal ends by an accordion hinge 115.

Upper and lower molded-sheet portions 112 and 114 are generally congruent to one another, in the sense that their dimensions are approximately the same and they fit together in approximate mirror image form. However, as will appear, structural differences between upper and lower molded-sheet portions 112 and 114 (in particular, how they interlock) make them not true mirror images of one another and not fully congruent.

In the commercial SEASHELL™ container, the package is a unitary, one-piece article, which is integrally formed by vacuum molding a plastic sheet. This is considered preferably from a manufacturing cost standpoint. However, the package may be manufactured as a two-piece article also, with or without a hinge. For example, if the package is manufactured as a two-piece article without a hinge, upper and lower molded-sheet portions 112 and 114 may be taped together.

Clamshell package 110 can be manufactured by vacuum molding approximately 0.020 to 0.024 inch thick polyvinyl chloride (PVC) sheet material. A preferred sheet material that may be used is PENTA-STAT™ PVC manufactured by Klockner. This material is static-dissipative, which permits avoiding the cost of an ESD (electrostatic discharge) bag that would otherwise be needed. The vacuum molding process is entirely conventional and involves use of techniques well known to persons of skill in the art. Other plastic materials besides PVC may be used to produce such a container, but PVC is considered to be the preferred manufacturing material.

The SEASHELL™ container design has been compared with other packages in regard to shock resistance, using a non-operating Seagate model No. ST31024A disc drive, accelerometer-equipped on appropriate axes. A bare drive dropped 12 inches to a hard surface received shock in excess of 1060 g, while a SEASHELL™-packaged drive registered less than 140 g for the same 12-inch drop. The bare drive subjected to a 120 degree topple sustained in excess of 1100 g while the SEASHELL™-packaged drive registered less than 200 g. A 20 kV "zap" test indicated that the SEASHELL™-packaged drive met current anti-static specifications as well as a drive in an ESD bag did. Other tests indicated that a SEASHELL™-packaged drive registered less than 200 g for 1.5 foot drops onto a thin ESD mat and 2 foot drops onto cardboard. With various configurations of the SEASHELL™ package, a disc drive may be protected from impact by reducing the externally delivered impact of at least 1000 g by a factor of 2.5. In still other configurations of the SEASHELL™ package, a disc drive may be protected from impact by reducing the externally delivered impact of at least 1000 g by a factor of 5.

A preferred embodiment of the present invention improves upon the basic SEASHELL™ design by providing an opening that is positioned so as to expose a connector or other physical interface on the contained storage device (e.g., disc drive). The improved container design provided by the present invention allows the storage device to remain within the shock-protective container during operation and during removal and installation (e.g., hot swapping). The opening further provides for direct connection between the input/output interface of the storage device and the interface of the computing system without the requirement of an interposer between the storage device and the computing system. This permits a reduction in the cost of manufacturing the container/package.

Figure 2:
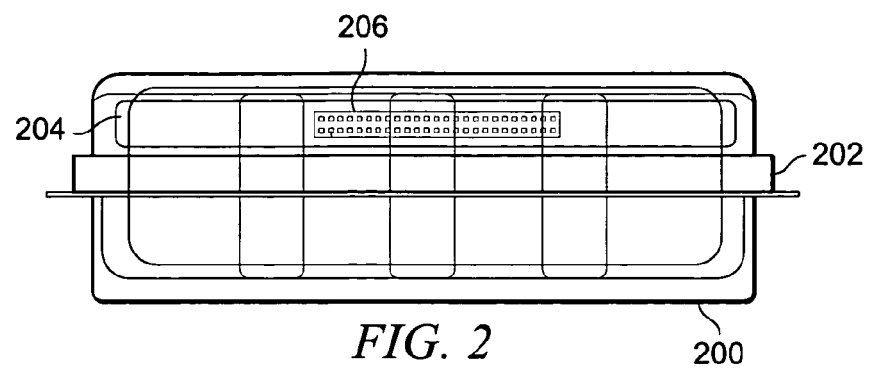
FIG. 2 is an exemplary diagram providing an end view of the distal end of a closed package in accordance with one exemplary embodiment of the present invention.

FIG. 2 is a diagram providing an end view of the distal end of a closed container 200 made in accordance with a preferred embodiment of the present invention. Container 200 is shown containing a storage device 202, which may be a disc drive, tape drive, or other form of storage device. An opening in container 200 is positioned so as to expose a physical interface 206 on storage device 202.

In a preferred embodiment, the upper and lower portions of the container 200, which may also be referred to as "domes", are configured so that the height, length and width, respectively, are not substantially greater than corresponding dimensions of the disc drive. The height, length and width are configured such that the disc drive, tape drive, or other storage device within the container 200 is insertable in a drivebay while the container encloses the storage device. The domes further include a plurality of resilient protrusions that aid in protecting the disc drive from impacts by acting as shock-absorbing members. These protrusions may be semi-circular in cross-section and may be spaced from one another in a manner such that they form columns or rows on the domes. In some embodiments, the protrusions may be deformable members that deform to absorb some of the energy of an impact.

In a preferred embodiment, this physical interface 206 conforms to the Serial-ATA storage device interface standard. While the preferred embodiments are described herein with regard to a Serial-ATA storage device interface, it should be appreciated that the present invention is not limited to such. Rather, other types of interfaces, such as a USB (Universal Serial Bus) interface, a firewire interface, serial attached SCSI (SAS), or a dual attachment station (DAS) interface and the like, may be used without departing from the spirit and scope of the present invention.

The Serial-ATA standard offers a number of advantages over other interfaces, and one of ordinary skill in the art will recognize that although other interfaces may be employed in an actual embodiment without departing from the scope and spirit of the present invention, some of the advantages of the Serial-ATA interface are suggestive of desirable qualities in a storage device interface to be used in the context of an embodiment of the present invention. In particular, the Serial-ATA interface supports hot-swapping of devices, as do other modern serial-based peripheral interfaces, such as USB and IEEE-1394 (a.k.a. "Firewire").

Figure 3:
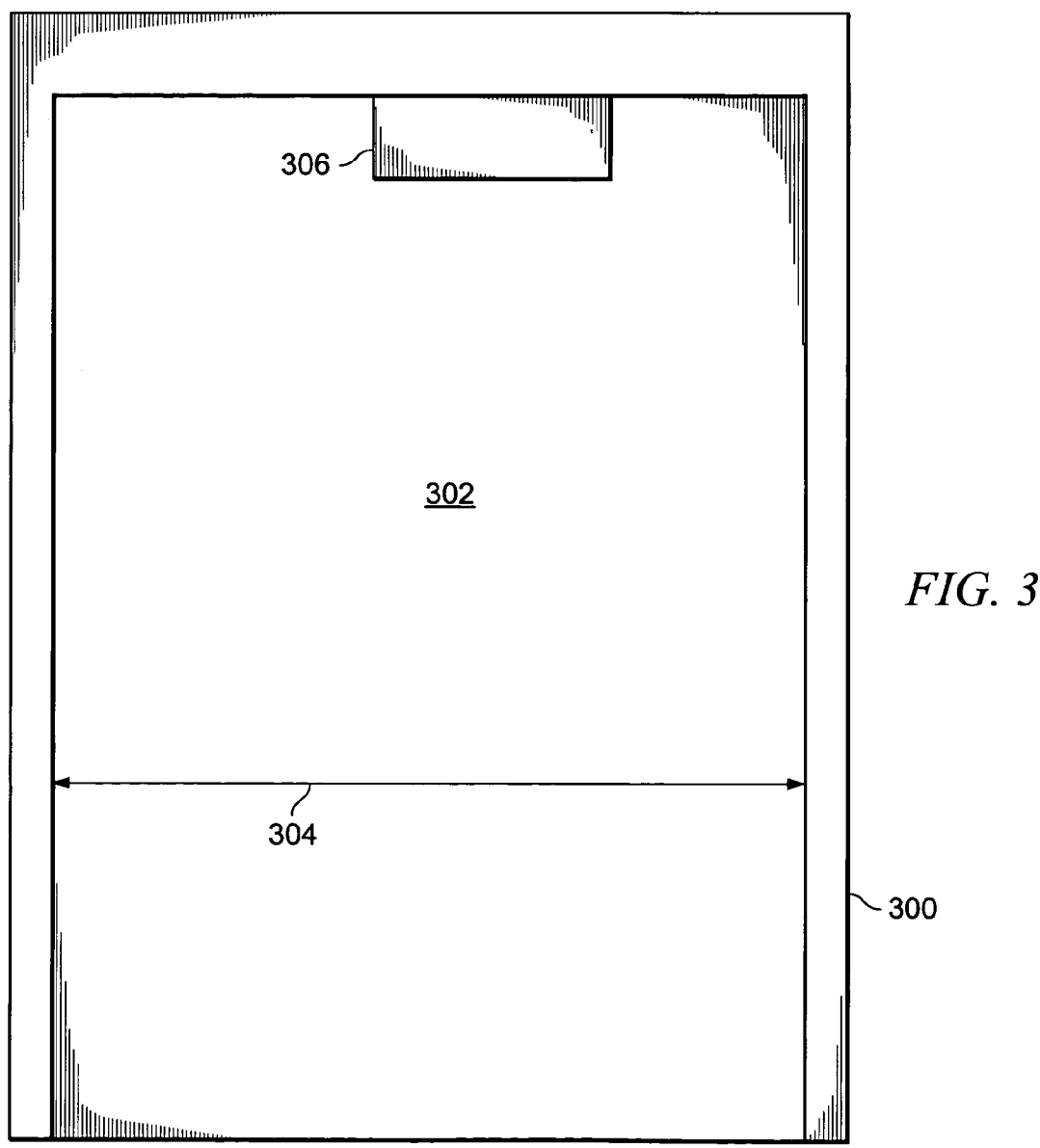
FIG. 3 is an exemplary diagram providing a view of a drivebay that may be used in conjunction with the exemplary embodiment of the present invention depicted in FIG. 2.

In addition, the physical connectors employed by the Serial-ATA interface are relatively forgiving in terms of connection tolerances such that the connectors are relatively tolerate of minor misalignments between the connectors. This enables easy connection and disconnection of a Serial-ATA storage device by sliding the device into a drivebay (as depicted in FIG. 3) without the need for extensive alignment mechanisms, such as tracks or rails. In addition, because the Serial-ATA connector is tolerant of minor misalignments, it is not necessary to include an interposer fixedly mounted to the structure of the container and to which the disc drive is connected when it is placed in the container. Thus, the use of the Serial-ATA interface eliminates the need for costly and additional alignment mechanisms such as interposers, tracks and rails, and the like.

Container 200 is preferably manufactured in a similar fashion to the basic SEASHELL™ container (clamshell package 110) described in FIG. 1. A sheet of a resilient static-dissipative sheet material (such as a static-dissipative PVC material) is cut in an appropriate location to form an opening, which will become opening 204. This sheet material is then vacuum-molded into the shape of clamshell package 110 in FIG. 1. If the opening is made in the proper location in the original sheet material, the vacuum molding process will result in a container that resembles container 200. In an alternative embodiment, a package without an opening, such as clamshell package 110, can be die cut or perforated in the location of opening 204 to allow that portion of the container to be knocked out or otherwise removed from the molded container.

Figure 4:
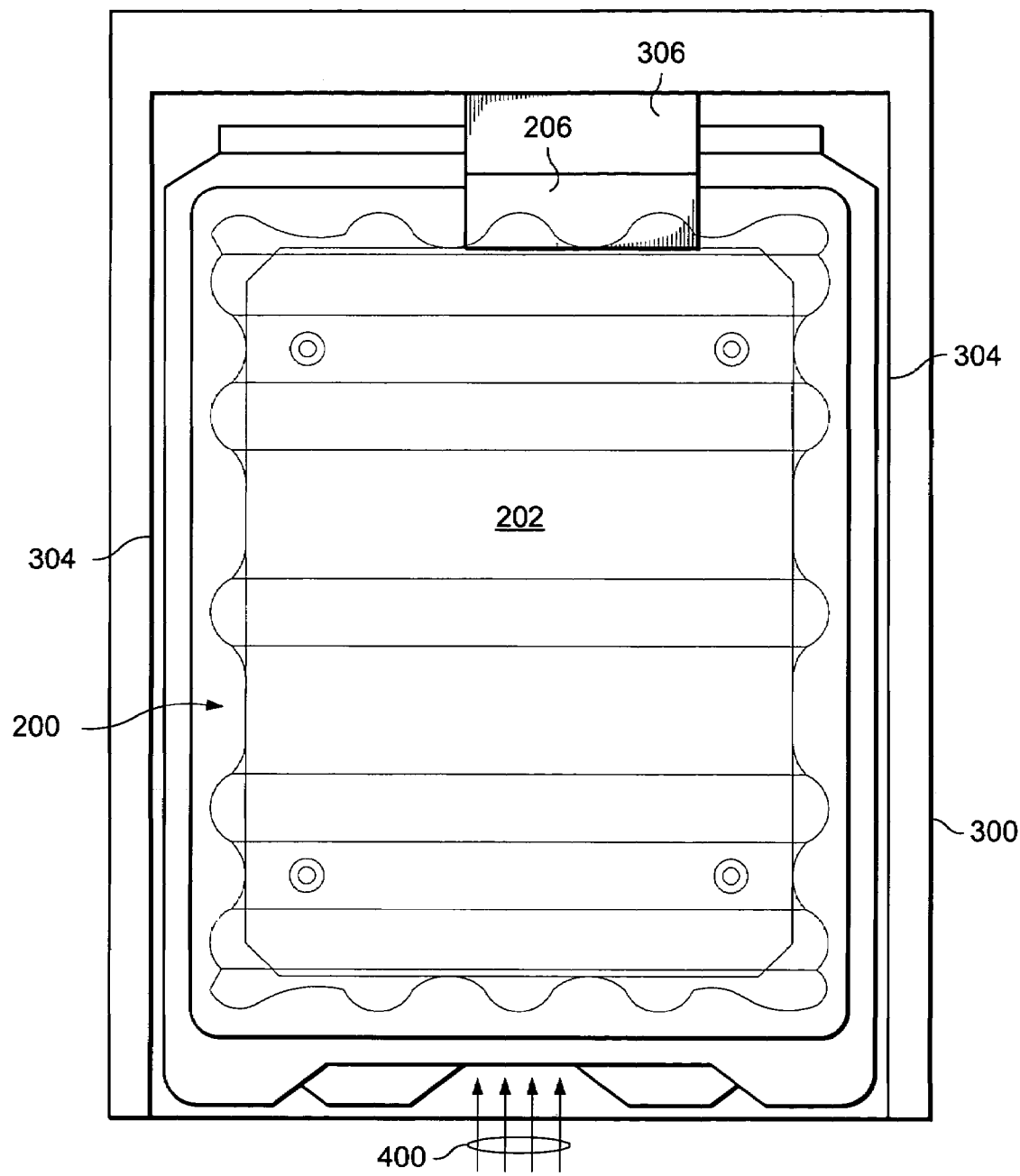
FIG. 4 is an exemplary diagram demonstrating the use of a the exemplary embodiment of the present invention depicted in FIG. 2 in conjunction with a drivebay.

FIGS. 3-4 describe the usage of a preferred embodiment of the present invention in the context of a drivebay 300. FIG. 3 depicts a cutaway view of a drivebay 300 seen from above. One of ordinary skill in the art will recognize that drivebays such as drivebay 300 may be present in a variety of different devices that make use of disc drives and other storage devices. For example, drivebay 300 may be part of the chassis of a personal computer, a workstation, a laptop or notebook computer, or a server. Alternatively, drivebay 300 may be an external device connected to a computer or may be part of an external computer peripheral, such as a storage array. Redundant arrays of independent discs (RAIDs) are an example of such a storage array.

Drivebay 300 has a rectangular space 302, bounded by side walls 304, for receiving a disc drive or other storage device. A physical interface 306 is positioned at the rear of drivebay 300 for interfacing with a storage device. In the context of a preferred embodiment of the present invention, physical interface 306 is a serial-ATA interface or some other hot-swappable interface.

As shown in FIG. 4, container 200, containing storage device 202, may be inserted into drivebay 300, as represented by lines of force 400. Opening 204 (in FIG. 2) exposes serial-ATA physical interface 206 on storage device 202. Sliding container 200 into drivebay 300 causes Serial-ATA interface 206 on storage device 202 to come into contact with Serial-ATA connector 306 in drivebay 300, which causes an electrical connection to be made between Serial-ATA interfaces 206 and 306. Because of the relatively forgiving range of tolerances for the Serial-ATA physical interface standard, Serial-ATA interfaces are guided together horizontally into electrical contact only by container 200's contact with sidewalls 304 of drivebay 300 and guided together vertically only by container 200's contact with the floor of drivebay 300.

One of ordinary skill in the art will recognize that storage device 202 may remain in container 200 and be protected from mechanical and electrostatic shocks during operation, insertion, and removal of storage device 202 from drivebay 300, as well as during shipping or other transportation of storage device 202. Opening 204 (FIG. 2) in container 200 also allows storage device 202 to be hot-swapped (assuming storage device 202 supports a hot-swappable interface) without removing storage device 202 from container 200.

The embodiments set forth above are based on Seagate's SEASHELL™ container, however the present invention is not limited to such. Rather, in another preferred embodiment of the present invention, the container is a hard statically dissipative plastic container that is formed and assembled around the storage device in a manner that ensures the alignment of the storage device Serial-ATA physical interface with the connector of the computing system and provides a more permanent enclosure surrounding the storage device. In this exemplary preferred embodiment, foam material is provided between the storage device and the sidewalls of the container. The foam material is packed such that the stiffness of the foam prevents the storage device from moving significantly within the container in any direction. In this way, the alignment of the Serial-ATA physical interface is maintained to be within a tolerance that is satisfactory based on the misalignment tolerance of the Serial-ATA physical interface.

Figure 5:
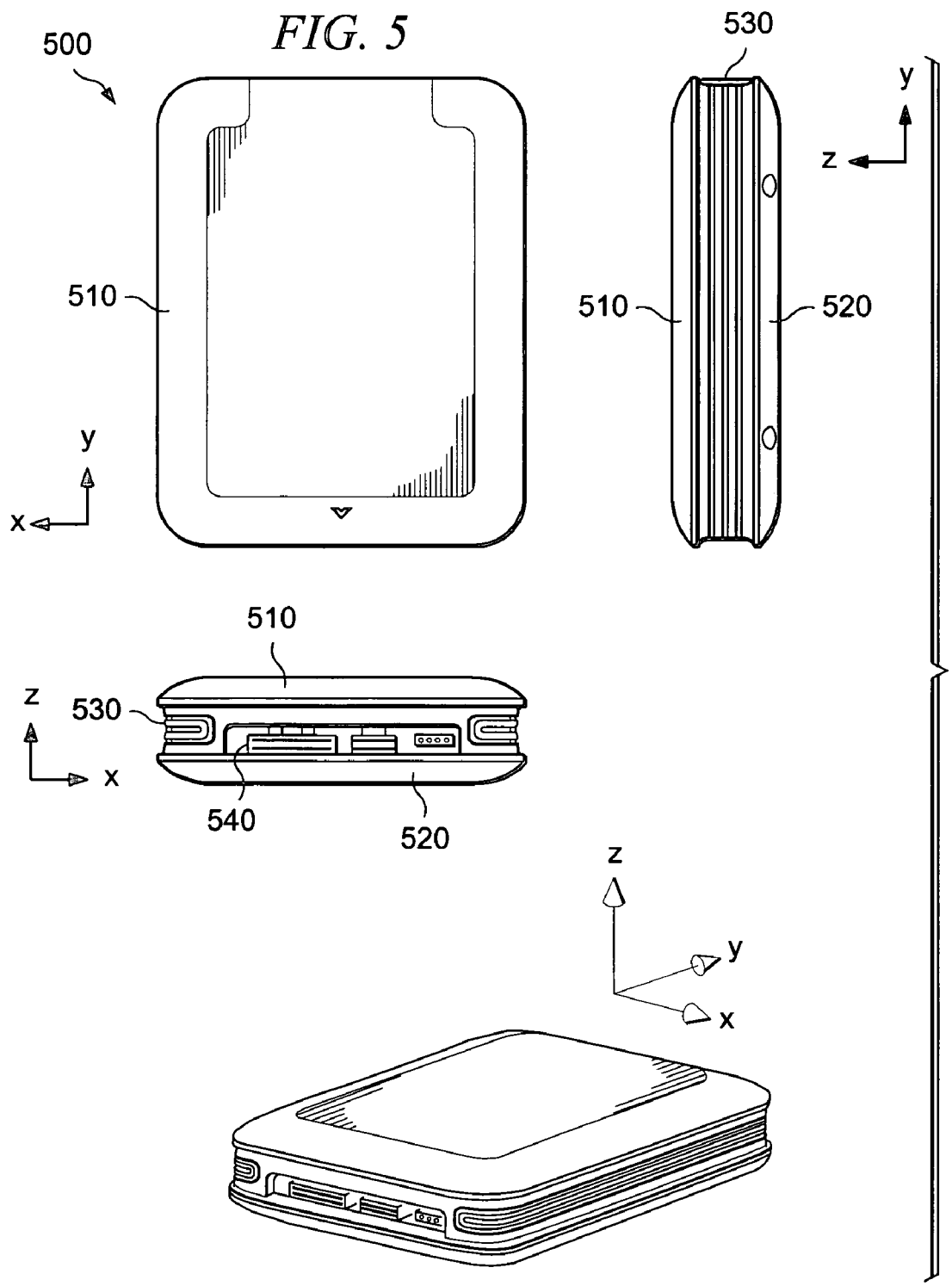
FIG. 5 is an exemplary diagram of a second exemplary embodiment of the present invention.

FIG. 5 is an exemplary diagram of a second exemplary embodiment of the present invention. As shown in FIG. 5, this alternative preferred embodiment depicts an alternative configuration for the enclosure that includes the upper and lower surface portions 510 and 520 of container 500 are smooth surfaces, although the present invention is not limited to such, and are separated by a middle section 530. The middle section 530 is formed as a band of material in which an opening 540 is present in a portion of the middle section 530 for exposing the Serial-ATA physical interface of the storage device within the container 500.

The upper and lower surface portions 510 and 520 may be fastened to the middle portion 530 using any suitable fastening mechanism including threaded fasteners, e.g., screws, clipping mechanisms, tab-and-slot fasteners, and the like. In one exemplary embodiment, the upper and lower surface portions 510 and 520 are configured to have a raised edge upon which are formed clips that engage recesses formed within the middle portion 530. In this way, when the upper and lower surface portions 510 and 520 are pressed onto the middle portion 530, the clips engage the recesses and fasten the upper and lower surface portions 510 and 520 to the middle portion 530.

Unlike the SEASHELL™ based embodiment described above, wherein the enclosure fit the storage device snuggly, the present alternative embodiment of the present invention provides that the dimensions of the container 500 are such that some space is permitted between the storage device and the sidewalls of the container 500. This allows the insertion of a foam material (not shown for clarity reasons) between the storage device and the sidewalls, e.g., upper and lower surface portions 510 and 520 and middle portion 530, of the container 500. This foam material serves two functions. First, it provides shock absorption for the storage device and thus, significantly reduces the amount of shock force that is permitted to be transferred to the storage device. Second, the foam material provides a stiffening structure that maintains the position of the storage device within the container relative to the sidewalls of the container.

In one preferred embodiment, the foam is formed and packed into the container formed by the portions 510, 520 and 530 such that the stiffness of the foam in two axes is greater than the stiffness in a third axis. In a preferred embodiment, the stiffness of the foam in the x and z axis directions, i.e. a height and width direction, is greater than the stiffness of the foam in a y-axis direction, i.e. a depth direction along a long axis of the container. For example, the stiffness of the foam in the x and z directions may be twice that of the stiffness of the foam in a y direction. This permits the foam to absorb greater shocks in the x and y directions which are the directions in which large handling shocks are expected to occur. Meanwhile, the lower stiffness in the y direction permits some minor movement of the storage device within the container 500 to facilitate any minor misalignment of the Serial-ATA physical interface when inserting the container 500 into a drivebay.

As mentioned previously, one of the principle advantages of the present invention is the ability to directly connect the physical interface of the storage device that is within the container to the physical interface of the computing device. That is, no interposers are necessary on the physical structure of the container and no ribbon cables or other intermediary connection mechanisms are required to access the physical interface of the storage device within the container.

In addition, in a preferred embodiment, the physical interface is a Serial-ATA physical interface that permits some minor misalignment between the Serial-ATA physical interface of the storage device and the physical interface of the computing device. Because of this, foam material may be used to maintain the orientation of the storage device within the container rather than expensive and complicated structures, since the foam material will resist large movements of the storage device within the container and any small misalignment due to shifting of the storage device within the container will be tolerated by the physical interface.

Figure 6:
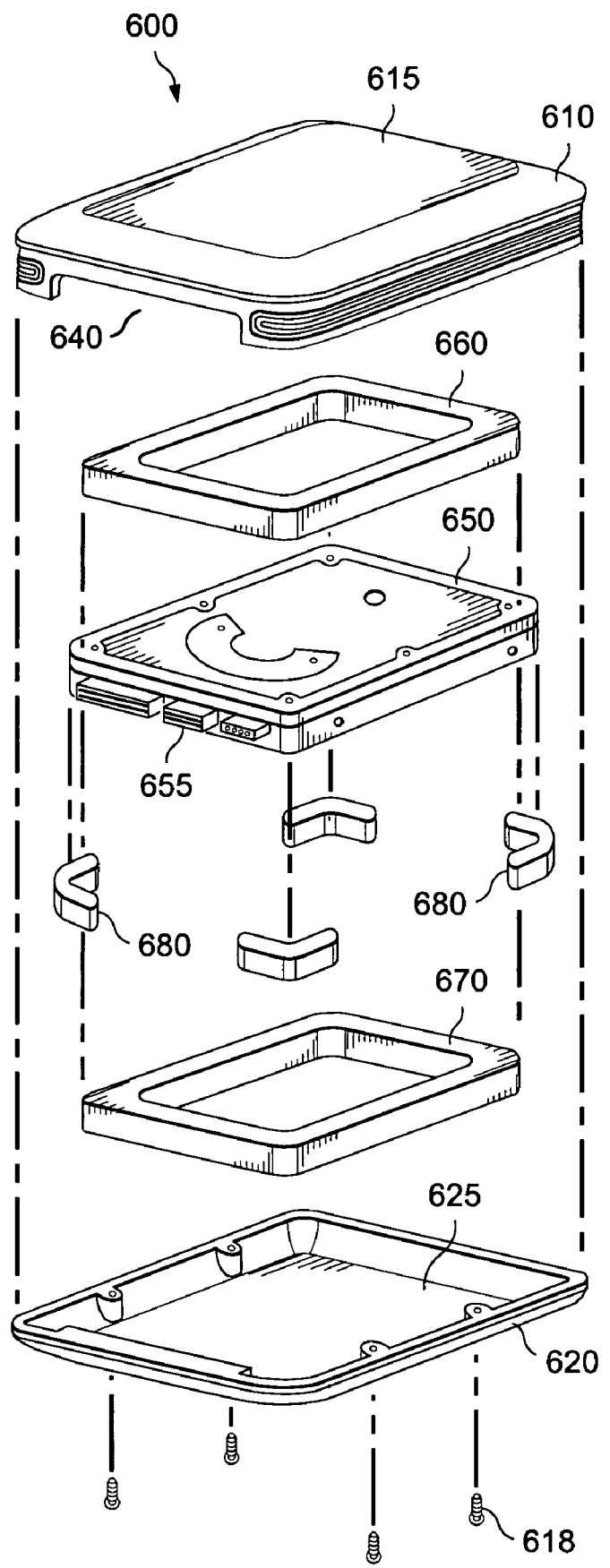
FIG. 6 is an exemplary diagram illustrating an exemplary assembly of a container in accordance with the second exemplary embodiment.

FIG. 6 is an exemplary diagram illustrating an exemplary assembly of a container in accordance with an alternative embodiment. As shown in FIG. 6, the container 600 is formed from two primary portions: an upper portion 610 and a lower portion 620. The upper and lower portions 610 and 620 have substantially flat surfaces 615 and 625 and may have curved or rounded edges. Because of this configuration, the upper and lower portions may be viewed as "domes." The upper portion 610 includes a vertical side portion 617 formed substantially perpendicular to the flat surface 615. In some embodiments, fastening mechanisms may be formed on the vertical side portion 617 to permit fastening of the upper and lower portions 610 and 620 together. In other embodiments, such as the one depicted, fasteners 618 may be provided for fastening the upper portion 610 to the lower portion 620.

As previously discussed above, the material for the portions 610 and 620 is preferably a static-dissipative hard plastic material. However, any type of material that resists static discharges, and provides sufficient strength to withstand deformation, may be used without departing from the spirit and scope of the present invention.

The upper portion 610 is formed such that the vertical side portion 617 includes an opening 640 formed therein when the upper portion 610 is fastened to the lower portion 620. The opening 640 is configured and positioned such that a physical interface 655 of the storage device 650 positioned within the container 600 may be accessible through the opening 640. The physical interface 655 of the storage device 650 may extend through the opening 640 or the physical interface of the computing device may extend through the opening 640 when the container 600 is positioned within a drivebay. In this way, the physical interface 655 of the storage device 650 within the container 600 may be directly connected with the physical interface of the computing device without the need for an interposer of any sort.

Recesses may be provided in the upper and lower portions 610 and 620, for use by the drivebay in ejecting the container 600 from the drivebay when necessary. That is, an ejection arm provided in the drivebay may push against the side of the container 600, or walls of the recess, to thereby disengage the physical interface 655 of the storage device 650 from the physical interface of the computing device. In this way, the container 600, and thus, the storage device 650 therein, is removable from the drivebay of the computing device. Thus, the storage device 650 within the container 600 is soft mountable, i.e. hot-swappable, by sliding the container 600 into the drivebay such that physical interface 655 of the storage device 650 within the container 600 directly engages the physical interface of the computing device, and is removable by an ejection arm that pushes on a surface of the container 600 in order to disengage the physical interface 655 of the storage device 650 from the physical interface of the computing device.

Foam portions 660 and 670 are provided along with foam corner cushions 680 for supporting the storage device 650 within the container 600 on both a top and bottom side of the storage device 650 and at the corners of the storage device 650. These foam cushion inserts aid in maintaining the orientation of the storage device 650 within the container 600 since the foam cushion material will resist large movements of the storage device 650 within the container 600 and any small misalignment due to shifting of the storage device 650 within the container 600 will be tolerated by the physical interface 655, e.g., the Serial-ATA interface.

The foam cushion portions 660 and 670 abut the upper and lower portions 610 and 620, respectively, with the foam corner cushions 680 abutting the corners of the vertical side 617 of the upper portion 610. The storage device 650 is positioned such that it lies on top of the foam cushion portion 670 and is sandwiched between foam cushion portions 660 and 670. The foam corner cushions 680 are positioned at the corners of the storage device 650. As a result, the storage device 650 is not permitted to move substantially within the container 600.

In yet another embodiment of the present invention, the foam cushion portions 660 and 670, foam corner cushions 680 and upper and lower portions 610 and 620 may aid in cooling the storage device 650 during operation. For example, the foam cushion portions 660 and 670 and foam corner cushions 680 may be formed from a thermally conductive visoelastic material. An example of such a material is a Bergquist SF1000 material which is impregnated with heat conductive ceramic particles. The thermally conductive visoelastic material cushions 660, 670 and 680 may then conduct heat from the storage device 650 to the upper and lower portions 610 and 620. Alternatively, a separate thermally conductive visoelastic material member (not shown) may be provided separate from, and in addition to, the foam cushions 660, 670 and 680 in order to achieve heat conduction to the upper and lower portions 610 and 620.

In addition, the upper and lower portions 610 and 620 may be made from a heat conductive material, such as an aluminum or magnesium material, which aids in dissipating the heat from the storage device 650. Thus, the foam cushion portions 660, 670 and the foam corner cushions 680 may conduct heat from the storage device 650 to the upper and lower portions 610 and 620 which dissipate the heat generated by the operation of the device to the ambient air. As a result, the operating temperature of the storage device 650 may be substantially decreased. This will greatly increase the reliability of the storage device 650 since errors in operation that occur due to temperature differentials and high operating temperatures are minimized.

Figure 7:
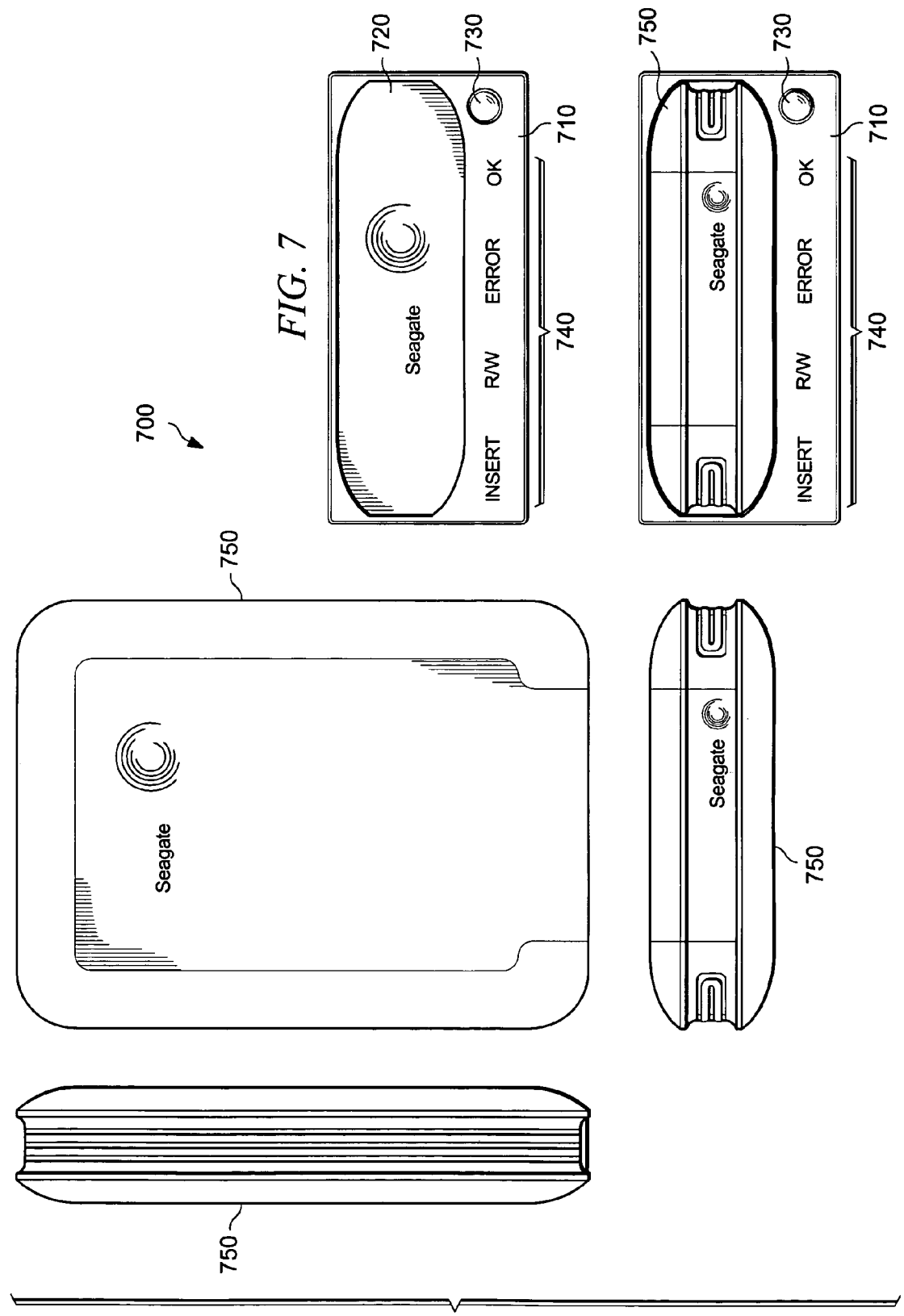
FIG. 7 is an exemplary diagram illustrating a container in accordance with the present invention and an associated drivebay into which the container may be inserted.

FIG. 7 is an exemplary diagram illustrating a container in accordance with the present invention and an associated drivebay into which the container may be inserted. As shown in FIG. 7, the drivebay 710 includes a drivebay door 720, an ejection button 730, and status indicators 740. The drivebay door 720 covers an opening in the drivebay 710 and is hinged on one side such that when the container 750 is pushed against the drivebay door 720, the drivebay door 720 swings inward to permit sliding of the container 750 into the opening in the drivebay 710. The sides of the opening in the drivebay 710 are preferably formed to fit the shape and size of the container 750. In this way, the sides of the opening are the only guidance means necessary for maintaining alignment of the container 750 within the drivebay 710.

While the sides of the opening in, the drivebay 710 provide the alignment mechanism for the container 750, as discussed above, the foam material within the container 750 provides the principle alignment mechanism of the physical interface of the storage device that is within the container 750. Therefore, through the use of these alignment mechanisms, the physical interface of the storage device within the container 750 is assured of being in the proper position for operation of the storage device with the computing device having the drivebay 710.

As mentioned previously, when the container 750 is placed fully within the drivebay 710, a physical interface of the storage device within the container 750 is directly connected with a mating physical interface of the computing device. This mating physical interface may be positioned, for example, in a rear wall of the drivebay 710 at a position where the physical interface of the computing device is aligned with the opening of a properly inserted container 750.

As illustrated in FIG. 7, when the container 750 is not inserted into the drivebay 710, status indicators 740 indicate that the drivebay 710 is ready for insertion of a container 750. When the container 750 is properly inserted within the drivebay 710, the status indicators 740 indicate that read/write capability is available to the storage device within the container 750. If there is a problem with the insertion of the container 750, an error will be indicated by the status indicators.

In addition, when the container 750 is not inserted into the drivebay 710, the ejection button 730 is in a first position such that it may not be depressed. When the container 750 is inserted into the drivebay 710, the container 750 may cause the ejection button 730 to protrude from the drivebay 710 such that it is depressible. When the ejection button 730 is depressed, an ejection arm may push against a surface of the container 750, such as the ejection recesses discussed with reference to FIG. 6, such that the physical interface of the storage device in the container 750 is disengaged from the physical interface of the computing device in the drivebay 710 and the container 750 may be removed from the drivebay 710 by a user.

Thus, the present invention provides an inexpensive, soft mounting direct connect storage device container or package. The present invention eliminates many of the expensive and complex mechanisms devised to maintain alignment of hot-swappable storage devices. As a result, alignment for proper use of the storage device with computing devices may be maintained by the present invention while providing a less costly device.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. package for protecting a soft mounting direct connect storage device, comprising:
a lower portion; and
an upper portion coupled to the lower portion, wherein the upper portion includes an opening formed therein, wherein the upper and lower portions are configured to surround the storage device, and wherein the opening is positioned such that a physical interface of the storage device is directly connectable to a physical interface of a computing device without an interposer between the physical interface of the storage device and the physical interface of the computing device.

2. The package of claim 1, wherein the upper and lower portions form sidewalls of the package, and wherein foam material is inserted around the storage device between the storage device and the sidewalls of the package.

3. The package of claim 2, wherein the foam material has as stiffness in two axes that is greater than a stiffness in a third axis.

4. The package of claim 3, wherein the two axes are an x and z axis, and the third axis is a y axis along a long axis of the package.

5. The package of claim 1, wherein the physical interface is a Serial-ATA physical interface.

6. The package of claim 1, wherein the upper portion and lower portion are coupled together using fasteners.

7. The package of claim 3, wherein the foam material includes an upper foam portion that is positioned between the upper portion and the storage device, and a lower foam portion that is positioned between the lower portion and the storage device.

8. The package of claim 3, wherein the foam material includes one or more foam corner cushions positioned between one or more corners of the storage device and one or more corners of the upper portion.

9. The package of claim 1, wherein the upper and lower portions are formed from a static-dissipative, resilient, plastic material.

10. The package of claim 1, wherein the upper portion and lower portion are made of a heat conductive material and are thermally coupled to the storage device by a heat conductive member.

11. The package of claim 10, wherein the heat conductive member is a thermally conductive elastomer.

12. The package of claim 11, wherein the thermally conductive elastomer is a cushion material inserted around the storage device between the storage device and the upper portion and lower portion of the package.

13. The package of claim 1, wherein the physical interface is one of a USB (Universal Serial Bus) interface, a firewire interface, a serial attached SCSI (SAS) interface, and a dual attachment station (DAS) interface.

14. A method of protecting a soft mounting direct connect storage device, comprising:
providing a lower portion of a protective package;
providing a lower foam cushion on the lower portion of the protective package;
placing the soft mounting direct connect storage device on the lower foam cushion;
providing an upper foam cushion on top of the soft mounting direct connect storage device;
providing one or more foam corner cushions at one or more corners of the soft mounting direct connect storage device;
providing an upper portion of a protective package; and
coupling the upper portion of the protective package to the lower portion of the protective package, wherein the upper portion includes an opening formed therein, wherein the upper and lower portions are configured to sultound the storage device, and wherein the opening is positioned such that a physical interface of the storage device is directly connectable to a physical interface of a computing device without an interposer between the physical interface of the storage device and the physical interface of the computing device.

15. The package of claim 1, and farther comprising:
a means for protecting the storage device from impact while being surrounded within the upper and lower portions.

16. The package of claim 15, wherein:
the upper and lower portions have a height, a length, and a width respectively not substantially greater than corresponding dimensions of the storage device.

17. The package of claim 15, wherein the upper and lower portions are selectively operable between an open position and a closed position.

18. The package of claim 15, wherein the means for protecting the storage device from impact comprises at least one foam cushion insert, wherein the at least one foam cushion insert is farther configured to maintain an orientation of the storage device within the upper and lower portions.

19. The package of claim 15, wherein the physical interface comprises a serial-ATA physical interface.

20. The package of claim 15, wherein the package has a configuration that permits the storage device to be inserted into a drive bay while the upper portion and lower portion enclose the storage device.

21. The package of claim 15, wherein the upper portion and lower portion are made of a heat conductive material and are thermally coupled to the storage device by a heat conductive member.

22. The package of claim 21, wherein the heat conductive member is a thermally conductive elastomer.

23. The package of claim 22, wherein the thermally conductive elastomer is a cushion material inserted around the storage device between the storage device and the upper portion and lower portion of the package.

24. The package of claim 15, wherein the physical interface is selected from the group consisting of a USB (Universal Serial Bus) interface, a firewire interface, a serial attached SCSI (SAS) interface, and a dual attachment station (DAS) interface.

25. The method of claim 14, and further comprising:
after the coupling step, connecting the storage device to the computing device by aligning a portion of the computing device with the opening to electrically connect the computing device to the physical interface without uncoupling the upper and lower portions.

26. The method of claim 25, wherein:
the upper and lower portions have a height, a length, and a width respectively not substantially greater than corresponding dimensions of the storage device.

27. The method of claim 25, wherein the features to protect the storage device from impact comprise at least one foam cushion insert, wherein the at least one foam cushion insert is further configured to maintain an orientation of the storage device within the enclosure.

28. The method of claim 24, wherein the physical interface comprises a serial-ATA physical interface.

29. The method of claim 25, wherein the upper portion and lower portion are made of a heat conductive material and are thermally coupled to the storage device by a heat conductive member.

30. The method of claim 29, wherein the heat conductive member is a thermally conductive elastomer.

31. The method of claim 30, wherein the thermally conductive elastomer is a cushion material inserted around the storage device between the storage device and the upper portion and lower portion of the package.

32. The method of claim 25, wherein the physical interface is selected from the group consisting of a USB (Universal Serial Bus) interface, a firewire interface, a serial attached SCSI (SAS) interface, and a dual attachment station (DAS) interface.

* * * * *

UNITED STATES PATENT AND TRADEMARK OFFICE
CERTIFICATE OF CORRECTION

PATENT NO. : 7,520,389 B2  Page 1 of 1
APPLICATION NO. : 10/852492
DATED : April 21, 2009
INVENTOR(S) : Marc Lalouette It is certified that error appears in the above-identified patent and that said Letters Patent is hereby corrected as shown below:

Title Pg
Item (73) Assignee: delete "Seagate Technologies, LLC, Shakopee, MN (US)" and insert --Seagate Technology LLC, Scotts Valley, CA (US)--

Column 1
Line 2 delete "Package" and insert --A package--

Column 12
Line 5 delete "sultound" and insert --surround--

Column 12
Line 25 delete "farther" and insert --further--

Signed and Sealed this

Twenty-fifth Day of August, 2009

David J. Kappos
*Director of the United States Patent and Trademark Office*